United States Patent
Ekberg et al.

(10) Patent No.: US 9,549,366 B2
(45) Date of Patent: Jan. 17, 2017

(54) METHOD AND APPARATUS FOR PROVIDING NETWORK ACCESS TO A CONNECTING APPARATUS

(75) Inventors: Jan-Erik Ekberg, Vantaa (FI); Rune Adolf Lindholm, Sottunga (FI); Jukka Tapio Virtanen, Helsinki (FI)

(73) Assignee: Nokie Technologies Oy, Espoo (FI)

( * ) Notice: Subject to any disclaimer, the term of this patent is extended or adjusted under 35 U.S.C. 154(b) by 123 days.

(21) Appl. No.: 14/128,662

(22) PCT Filed: Jul. 1, 2011

(86) PCT No.: PCT/IB2011/052931
§ 371 (c)(1),
(2), (4) Date: Dec. 23, 2013

(87) PCT Pub. No.: WO2013/005075
PCT Pub. Date: Jan. 10, 2013

(65) Prior Publication Data
US 2014/0220929 A1    Aug. 7, 2014

(51) Int. Cl.
*H04W 12/06* (2009.01)
*H04W 48/08* (2009.01)
*H04L 12/14* (2006.01)
*H04W 4/00* (2009.01)

(52) U.S. Cl.
CPC .......... *H04W 48/08* (2013.01); *H04L 12/1457* (2013.01); *H04W 4/001* (2013.01); *H04W 4/003* (2013.01); *H04W 12/06* (2013.01)

(58) Field of Classification Search
None
See application file for complete search history.

(56) References Cited

U.S. PATENT DOCUMENTS 6,877,094 B1   4/2005   DiGiorgio et al.
6,985,756 B2   1/2006   Castrogiovanni et al.
(Continued)

FOREIGN PATENT DOCUMENTS

CA   2664848 A1   4/2008
EP   1 777 978 A1   4/2007
(Continued)

OTHER PUBLICATIONS

International Preliminary Report for Application No. PCT/IB2011/052931;dated Jan. 7, 2014.
(Continued)

*Primary Examiner* — Quan M Hua
(74) *Attorney, Agent, or Firm* — Alston & Bird LLP

(57) ABSTRACT

A method and apparatus are provided for providing network access to a connecting apparatus. A method may include determining, at a terminal apparatus, a selection of a network access credential for a network from a plurality of available network access credentials installed on the terminal apparatus. The method may further include responsive to the selection, activating the selected network access credential. The method may additionally include using the activated network access credential to cause a connecting apparatus to be provided with access to the network via a local connection between the terminal apparatus and the connecting apparatus. A corresponding apparatus is also provided.

26 Claims, 7 Drawing Sheets

(56) References Cited

U.S. PATENT DOCUMENTS

| | | | |
|---|---|---|---|
| 2006/0212938 A1* | 9/2006 | Suzuki | H04L 63/08 726/16 |
| 2008/0081611 A1 | 4/2008 | Hoyt et al. | |
| 2009/0186668 A1* | 7/2009 | Rahman | H04M 1/6066 455/575.2 |
| 2010/0005294 A1* | 1/2010 | Kostiainen | H04B 10/1143 713/168 |
| 2010/0311402 A1 | 12/2010 | Srinivasan et al. | |
| 2012/0108206 A1* | 5/2012 | Haggerty | H04W 12/06 455/411 |

FOREIGN PATENT DOCUMENTS

| | | |
|---|---|---|
| GB | 2 293 946 A | 4/1996 |
| WO | WO 92/19078 A1 | 10/1992 |
| WO | WO-01/37517 A2 | 5/2001 |
| WO | WO 2004/036856 A1 | 4/2004 |
| WO | WO 2006/097625 A1 | 9/2006 |
| WO | WO-2008/088923 A2 | 7/2008 |
| WO | WO-2009/095295 A1 | 8/2009 |
| WO | WO 2010/045652 A2 | 4/2010 |
| WO | WO-2011/008588 A1 | 1/2011 |

OTHER PUBLICATIONS

International Search Report and Written Opinion for Application No. PCT/IB2011/052931;dated Mar. 21, 2012.

Extended European Search Report from corresponding European Patent Application No. 11869179.9 dated Feb. 19, 2015.

Office Action from corresponding Chinese Patent Application No. 201180071030.6 dated May 5, 2016.

Office Action from corresponding Chinese Patent Application No. 201180071030.6 dated Nov. 4, 2016.

* cited by examiner

METHOD AND APPARATUS FOR PROVIDING NETWORK ACCESS TO A CONNECTING APPARATUS

TECHNOLOGICAL FIELD

Example embodiments of the present invention relate generally to communications technology and, more particularly, relate to a method and apparatus for providing network access to a connecting apparatus.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

Generally, an operator of a network requires a mobile computing device to be provisioned with network access credentials, such as a Subscriber Identity Module (SIM) as a condition for granting access or usage privileges for the network to the mobile computing device. In this regard, a network operator generally charges an access or other usage fee to a user of a mobile computing device on the basis of the network access credentials implemented on the user's mobile computing device.

BRIEF SUMMARY

A system, method, and apparatus are herein provided for providing network access to a connecting apparatus. Systems, methods, and apparatuses in accordance with various embodiments may provide several advantages to computing devices, computing device users, product vendors, product manufacturers, and consumers. For example, some example embodiments provide for machine-to-machine communication between a terminal apparatus and a connecting apparatus via a local connection to enable the connecting apparatus to use (for example, lease) a communication facility of the terminal apparatus to connect to a network. In this regard, in some example embodiments, a terminal apparatus may be provisioned with a plurality of network access credentials, which may include a network access credential associated with the connecting apparatus. Accordingly, the connecting apparatus may be provided with network access using the network access credential associated with the connecting apparatus such that any charges that may be occurred through the connecting apparatuses usage of the network may be charged to an appropriate account. Consumers and manufacturers of the connecting apparatus may accordingly benefit from cost reductions, as it may be cheaper to purchase and manufacture a connecting apparatus that does not need to include its own dedicated network access hardware, such as a cellular network module, in order to support self-reporting, remote monitoring, and/or other features that may require network communication.

In a first example embodiment, a method is provided, which may comprise determining, at a terminal apparatus, a selection of a network access credential for a network from a plurality of available network access credentials installed on the terminal apparatus. The method of this example embodiment may further comprise responsive to the selection, activating the selected network access credential. The method of this example embodiment may additionally comprise using the activated network access credential to cause a connecting apparatus to be provided with access to the network via a local connection between the terminal apparatus and the connecting apparatus.

In another example embodiment, an apparatus comprising at least one processor and at least one memory storing computer program code is provided. The at least one memory and stored computer program code may be configured, with the at least one processor, to cause the apparatus of this example embodiment to at least perform determining, at a terminal apparatus, a selection of a network access credential for a network from a plurality of available network access credentials installed on the terminal apparatus. The at least one memory and stored computer program code may be configured, with the at least one processor, to further cause the apparatus of this example embodiment to perform, responsive to the selection, activating the selected network access credential. The at least one memory and stored computer program code may be configured, with the at least one processor, to additionally cause the apparatus of this example embodiment to perform using the activated network access credential to cause a connecting apparatus to be provided with access to the network via a local connection between the terminal apparatus and the connecting apparatus.

In a further example embodiment, an apparatus is provided that may comprise means for determining, at a terminal apparatus, a selection of a network access credential for a network from a plurality of available network access credentials installed on the terminal apparatus. The apparatus of this example embodiment may further comprise means for, responsive to the selection, activating the selected network access credential. The apparatus of this example embodiment may additionally comprise means for using the activated network access credential to cause a connecting apparatus to be provided with access to the network via a local connection between the terminal apparatus and the connecting apparatus.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
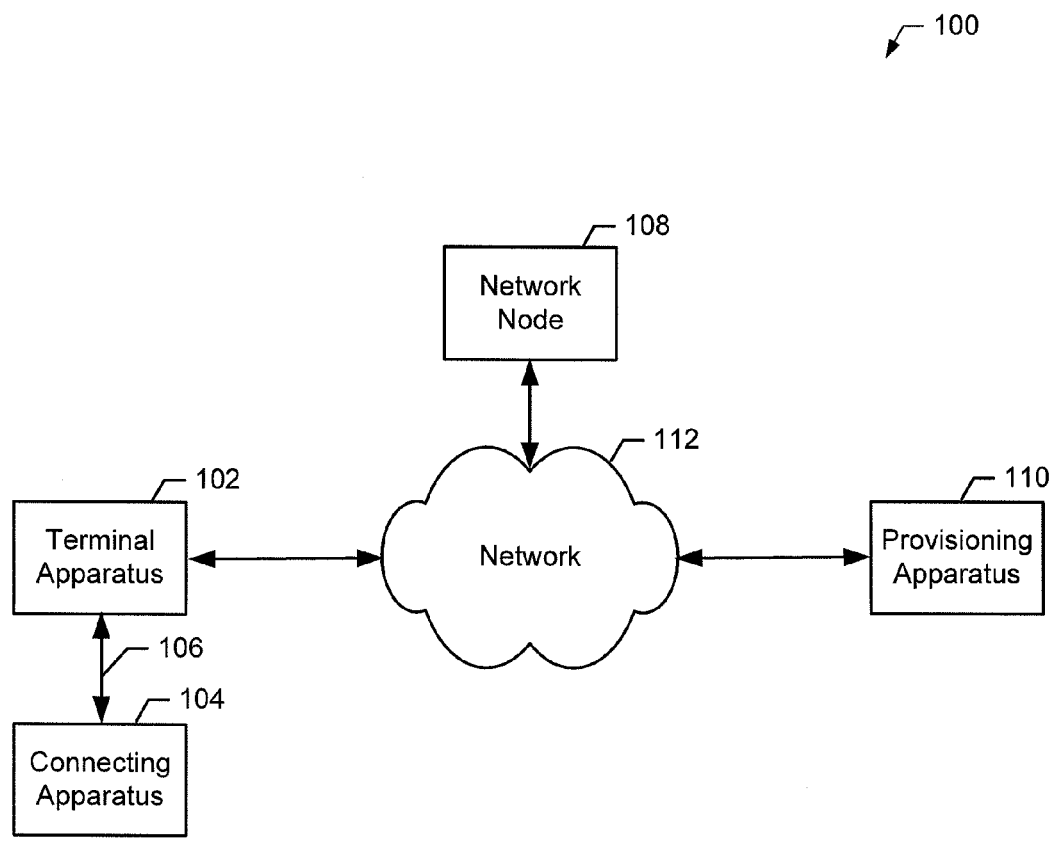
Figure 2:
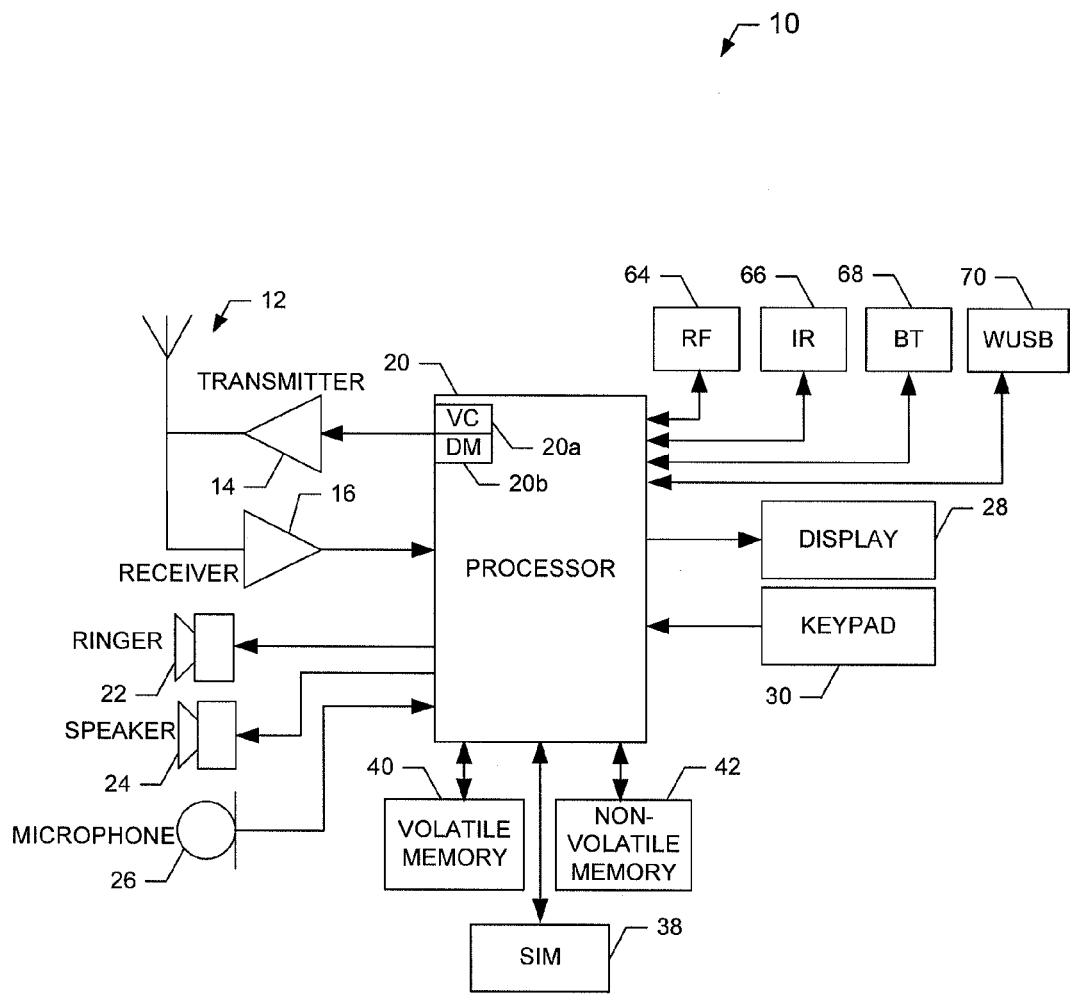
Figure 3:
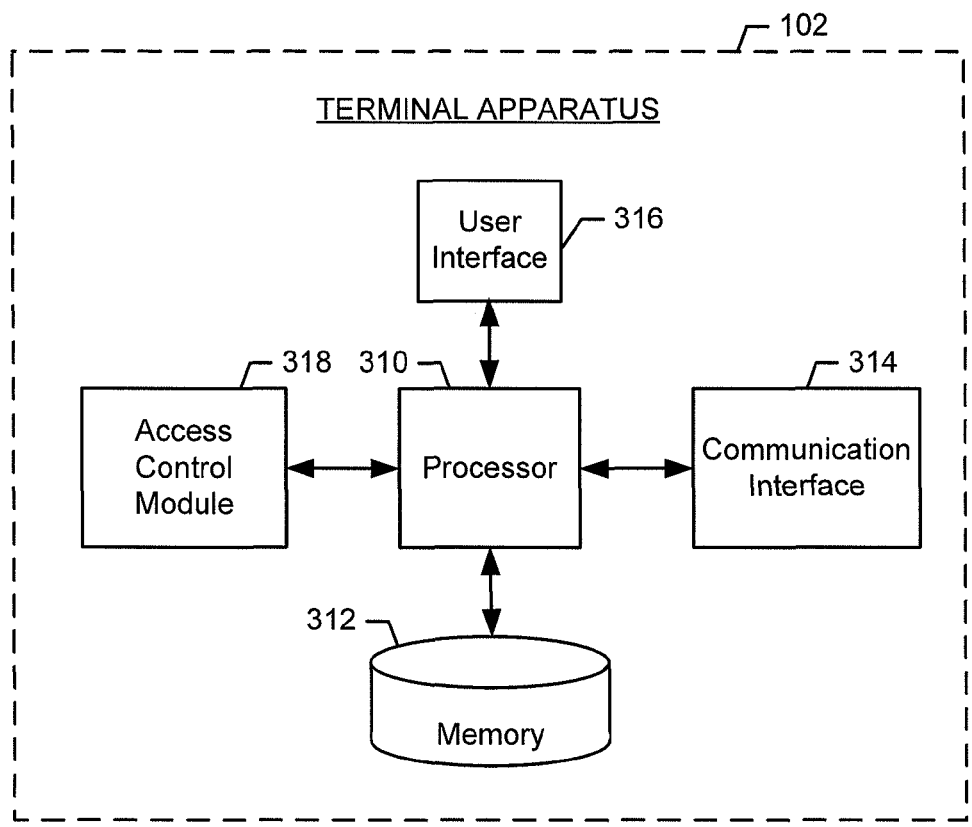
Figure 4:
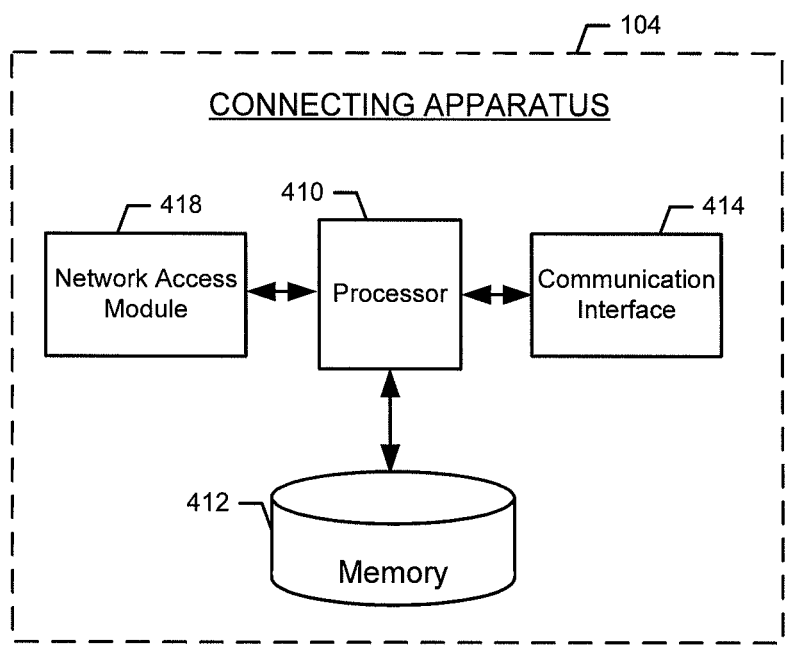
Figure 5:
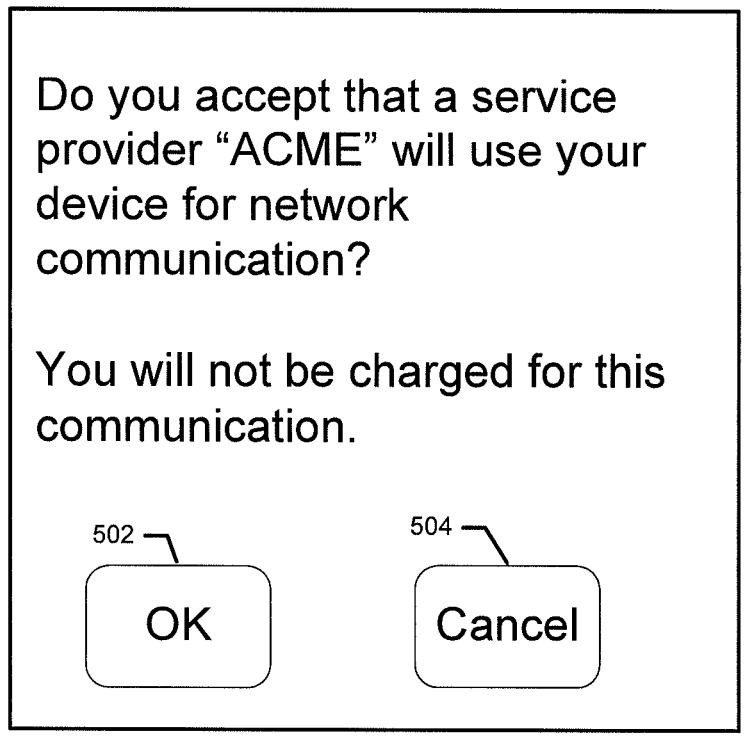
Figure 6:
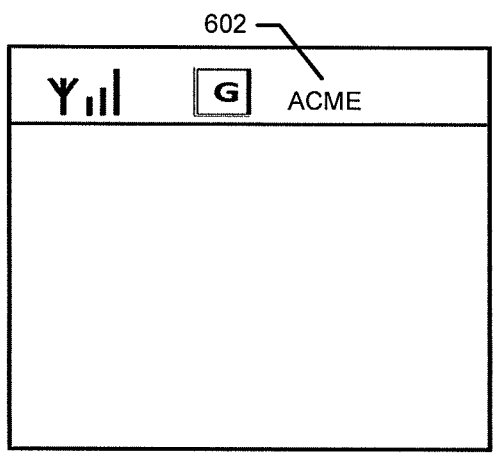
Figure 7:
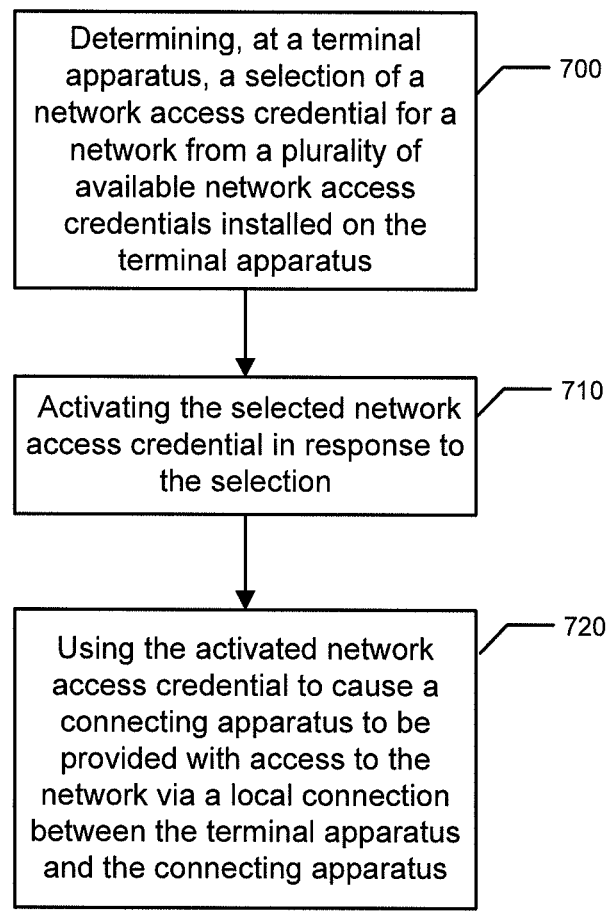
Figure 8:
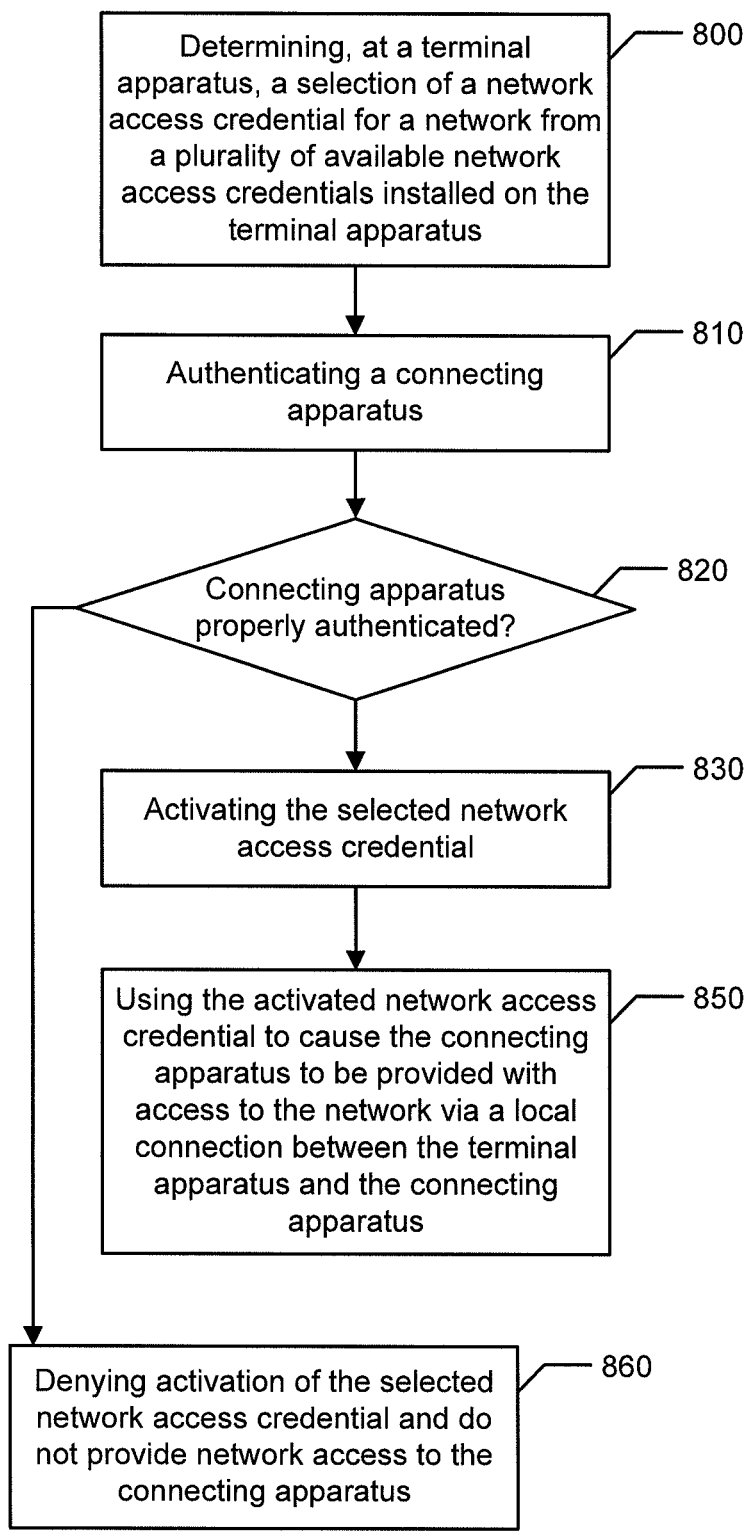

Having thus described example embodiments of the invention in general terms, reference will now be made to the accompanying drawings, which are not necessarily drawn to scale, and wherein:

FIG. 1 illustrates a system for providing network access to a connecting apparatus according to some example embodiments;

FIG. 2 is a schematic block diagram of a mobile terminal according to some example embodiments;

FIG. 3 illustrates a block diagram of a terminal apparatus according to some example embodiments;

FIG. 4 illustrates a block diagram of a connecting apparatus according to some example embodiments;

FIG. 5 illustrates an example user notification that may be provided in accordance with some example embodiments;

FIG. 6 illustrates another example user notification that may be provided in accordance with some example embodiments;

FIG. 7 illustrates a flowchart according to an example method for providing network access to a connecting apparatus according to some example embodiments; and FIG. 8 illustrates a flowchart according to another example method for providing network access to a connecting apparatus according to some example embodiments.

DETAILED DESCRIPTION

Some example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Consumer electronics, appliances, and other devices are being developed with an increasing capability set, which is often driven by the integration of computing technology into the devices. These enhanced capability sets are often supported through data exchange and communication over a network. For example, some cars collect information regarding engine use and state of repair, status information about safety devices installed in the car, and/or the like. During a manufacturer warranty period, the car manufacturer may remotely collect this information at its own cost to monitor and identify potential issues with the car to facilitate reacting in advance to address potential problems before more costly repairs are required. As another example, refrigerators are being developed with the capability to monitor and self-report the food contents of the refrigerator to enable functions such as automated ordering of groceries based on supply levels in the refrigerator.

FIG. 1 illustrates a diagram of a system 100 for providing network access to a connecting apparatus according to some example embodiments. In this regard, some example embodiments may provide network access to consumer electronics, appliances, and/or other connecting devices to enable the connecting device to exchange information with a network node. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for providing network access to a connecting apparatus, numerous other configurations may also be used to implement embodiments of the present invention.

In some example embodiments, the system 100 may include a terminal apparatus 102 and connecting apparatus 104. The terminal apparatus 102 and connecting apparatus 104 may be configured to establish a local connection 106 and exchange data over the local connection 106. The local connection 106 may, for example, comprise a wired or wireless local connection between the terminal apparatus 102 and the connecting apparatus 104. By way of non-limiting example, the local connection 106 may comprise a universal serial bus (USB) connection, Institute of Electrical and Electronics Engineers (IEEE) 1394 connection, serial connection, parallel connection, wireless USB connection, Bluetooth connection, radio frequency connection, Infrared Data Association (IrDA) connection, ZigBee connection, ultra wideband (UWB), Z-Wave connection, connection in accordance with IEEE 802.15, a wireless local area network (WLAN) connection, or the like. In this regard, the local connection 106 may comprise any connection by which the terminal apparatus 102 and connecting apparatus 104 may exchange data.

The terminal apparatus 102 may comprise any computing device configured to connect to the network 112 through the use of a respective network access credential. By way of non-limiting example, the terminal apparatus 102 may be embodied as a computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), a chipset, an apparatus comprising a chipset, any combination thereof, and/or the like.

The network 112 may comprise any network to which access is based on a network access credential, which may be used to support account charging and/or other user-specific services. By way of non-limiting example, the network 112 may comprise one or more wireless networks (for example, a cellular network, wireless local area network, wireless metropolitan area network, and/or the like), one or more wireline networks, or some combination thereof, and in some embodiments may comprise at least a portion of the internet.

The connecting apparatus 104 may be embodied as any apparatus configured to exchange data with a network node 108 over a connection to the network 112 provided by the terminal apparatus 102 in accordance with one or more example embodiments. In this regard, a connecting apparatus 104 may comprise any machine or device configured to collect and report information (for example, diagnostic information, status information, and/or the like) to a network node 108, to receive configuration information from the network node 108, and/or the like. By way of non-limiting example, the connecting apparatus 104 may comprise or be implemented on a consumer electronic device, an appliance (for example, a refrigerator), car, and/or other machine or device.

The network node 108 may comprise a computing device that may be operated by an entity which may collect data from the connecting apparatus 104, remotely monitor the connecting apparatus 104, remotely configure the connecting apparatus 104, and/or the like. In this regard, the network node 108 may be maintained by a manufacturer of the connecting apparatus 104, a vendor of the connecting apparatus 104, a service provider associated with the connecting apparatus 104, and/or the like. The network node 108 may be configured to communicate with the terminal apparatus 102 via the network 112. By way of non-limiting example, the network node 108 may be embodied as one or more servers, a server cluster, a cloud computing infrastructure, one or more desktop computers, one or more laptop computers, one or more network nodes, multiple computing devices in communication with each other, a chipset, an apparatus comprising a chipset, any combination thereof, and/or the like.

The system 100 may further comprise a provisioning apparatus 110. The provisioning apparatus 110 may be embodied as one or more servers, a server cluster, a cloud computing infrastructure, one or more desktop computers, one or more laptop computers, one or more network nodes, multiple computing devices in communication with each other, a chipset, an apparatus comprising a chipset, any combination thereof, and/or the like. In some example embodiments, the provisioning apparatus 110 may comprise an entity configured to provision network access credentials to an apparatus, such as the terminal apparatus 102. The provisioning apparatus 110 may accordingly be operated by a network operator (for example, an operator of the network 112, or portion thereof). In some example embodiments, the provisioning apparatus 110 may be configured to provision the terminal apparatus 102 with network access credentials via the network 112.

According to some example embodiments, the terminal apparatus 102 may be embodied as a mobile terminal, such as that illustrated in FIG. 2. In this regard, FIG. 2 illustrates a block diagram of a mobile terminal 10 representative of some embodiments of a terminal apparatus 102. It should be understood, however, that the mobile terminal 10 illustrated and hereinafter described is merely illustrative of one type of terminal apparatus 102 that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like.

For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display, a joystick, and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. The mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40, non-volatile memory 42 may also include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Referring now to FIG. 3, FIG. 3 illustrates a block diagram of a terminal apparatus 102 according to some example embodiments. In some example embodiments, the terminal apparatus 102 may include various means for performing the various functions herein described. These means may comprise one or more of a processor 310, memory 312, communication interface 314, user interface 316, or access control module 318. The means of the terminal apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 312) that is executable by a suitably configured processing device (for example, the processor 310), or some combination thereof.

In some example embodiments, one or more of the means illustrated in FIG. 3 may be embodied as a chip or chip set. In other words, the terminal apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 310, memory 312, communication interface 314, user interface 316, and/or access control module 318 may be embodied as a chip or chip set. The terminal apparatus 102 may therefore, in some example embodiments, be configured to implement example embodiments of the present invention on a single chip or as a single "system on a chip." As another example, in some example embodiments, the terminal apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 310 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some example embodiments the processor 310 may comprise a plurality of processors. The plurality of processors may be in operative communication with each other and may be collectively configured to perform one or more functionalities of the terminal apparatus 102 as described herein. The plurality of processors may be embodied on a single computing device or distributed across a plurality of computing devices collectively configured to function as the terminal apparatus 102. In embodiments wherein the terminal apparatus 102 is embodied as a mobile terminal 10, the processor 310 may be embodied as or may comprise the processor 20. In some example embodiments, the processor 310 is configured to execute instructions stored in the memory 312 or otherwise accessible to the processor 310. These instructions, when executed by the processor 310, may cause the terminal apparatus 102 to perform one or more of the functionalities of the terminal apparatus 102 as described herein. As such, whether configured by hardware or software methods, or by a combination thereof, the processor 310 may comprise an entity capable of performing operations according to embodiments of the present invention while configured accordingly. Thus, for example, when the processor 310 is embodied as an ASIC, FPGA or the like, the processor 310 may comprise specifically configured hardware for conducting one or more operations described herein. Alternatively, as another example, when the processor 310 is embodied as an executor of instructions, such as may be stored in the memory 312, the instructions may specifically configure the processor 310 to perform one or more algorithms and operations described herein.

The memory 312 may comprise, for example, volatile memory, non-volatile memory, or some combination thereof. In this regard, the memory 312 may comprise a non-transitory computer-readable storage medium. Although illustrated in FIG. 3 as a single memory, the memory 312 may comprise a plurality of memories. The plurality of memories may be embodied on a single computing device or may be distributed across a plurality of computing devices collectively configured to function as the terminal apparatus 102. In various example embodiments, the memory 312 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the terminal apparatus 102 is embodied as a mobile terminal 10, the memory 312 may comprise the volatile memory 40 and/or the non-volatile memory 42. The memory 312 may be configured to store information, data, applications, instructions, or the like for enabling the terminal apparatus 102 to carry out various functions in accordance with various example embodiments. For example, in some example embodiments, the memory 312 may be configured to buffer input data for processing by the processor 310. Additionally or alternatively, the memory 312 may be configured to store program instructions for execution by the processor 310. The memory 312 may store information in the form of static and/or dynamic information. This stored information may be stored and/or used by the access control module 318 during the course of performing its functionalities.

The communication interface 314 may be embodied as any device or means embodied in circuitry, hardware, a computer program product comprising computer readable program instructions stored on a computer readable medium (for example, the memory 312) and executed by a processing device (for example, the processor 310), or a combination thereof that is configured to receive and/or transmit data from/to another computing device. According to some example embodiments, the communication interface 314 may be at least partially embodied as or otherwise controlled by the processor 310. In this regard, the communication interface 314 may be in communication with the processor 310, such as via a bus. The communication interface 314 may include, for example, an antenna, a transmitter, a receiver, a transceiver and/or supporting hardware or software for enabling communications with one or more remote computing devices. The communication interface 314 may be configured to receive and/or transmit data using any protocol that may be used for communications between computing devices. In this regard, the communication interface 314 may be configured to receive and/or transmit data using any protocol that may be used for transmission of data over a wireless network, wireline network, some combination thereof, or the like by which the terminal apparatus 102 and one or more computing devices or computing resources may be in communication. As an example, the communication interface 314 may be configured to enable communication between the terminal apparatus 102 and a connecting apparatus 104 via a local connection 106. As a further example, the communication interface 314 may be configured to enable communication between the terminal apparatus 102 and a network node 108, provisioning apparatus 110, and/or other entity via the network 112. The communication interface 314 may additionally be in communication with the memory 312, user interface 316, and/or access control module 318, such as via a bus.

The user interface 316 may be in communication with the processor 310 to receive an indication of a user input and/or to provide an audible, visual, mechanical, or other output to a user. As such, the user interface 316 may include, for example, a keyboard, a mouse, a joystick, a display, a touch screen display, a microphone, a speaker, and/or other input/output mechanisms. In embodiments wherein the user interface 316 comprises a touch screen display, the user interface 316 may additionally be configured to detect and/or receive an indication of a touch gesture or other input to the touch screen display. The user interface 316 may be in communication with the memory 312, communication interface 314, and/or access control module 318, such as via a bus.

The access control module 318 may be embodied as various means, such as circuitry, hardware, a computer program product comprising computer readable program instructions stored on a computer readable medium (for example, the memory 312) and executed by a processing device (for example, the processor 310), or some combination thereof and, in some example embodiments, may be embodied as or otherwise controlled by the processor 310. In embodiments wherein the access control module 318 is embodied separately from the processor 310, the access control module 318 may be in communication with the processor 310. The access control module 318 may further be in communication with one or more of the memory 312, communication interface 314, or user interface 316, such as via a bus.

Referring now to FIG. 4, FIG. 4 illustrates a block diagram of a connecting apparatus 104 according to some example embodiments. In some example embodiments, the connecting apparatus 104 may include various means for performing the various functions herein described. These means may comprise one or more of a processor 410, memory 412, communication interface 414, or network access module 418. The means of the connecting apparatus 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 412) that is executable by a suitably configured processing device (for example, the processor 410), or some combination thereof.

In some example embodiments, one or more of the means illustrated in FIG. 4 may be embodied as a chip or chip set. In other words, the connecting apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 410, memory 412, communication interface 414, and/or network access module 418 may be embodied as a chip or chip set. The connecting apparatus 104 may therefore, in some example embodiments, be configured to implement embodiments of the present invention on a single chip or as a single "system on a chip." As another example, in some example embodiments, the connecting apparatus 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 410 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some example embodiments the processor 410 may comprise a plurality of processors. The plurality of processors may be in operative communication with each other and may be collectively configured to perform one or more functionalities of the connecting apparatus 104 as described herein. The plurality of processors may be embodied on a single computing device or distributed across a plurality of computing devices collectively configured to function as the connecting apparatus 104. In some example embodiments, the processor 410 is configured to execute instructions stored in the memory 412 or otherwise accessible to the processor 410. These instructions, when executed by the processor 410, may cause the connecting apparatus 104 to perform one or more of the functionalities of the connecting apparatus 104 as described herein. As such, whether configured by hardware or software methods, or by a combination thereof, the processor 410 may comprise an entity capable of performing operations according to embodiments of the present invention while configured accordingly. Thus, for example, when the processor 410 is embodied as an ASIC, FPGA or the like, the processor 410 may comprise specifically configured hardware for conducting one or more operations described herein. Alternatively, as another example, when the processor 410 is embodied as an executor of instructions, such as may be stored in the memory 412, the instructions may specifically configure the processor 410 to perform one or more algorithms and operations described herein.

The memory 412 may comprise, for example, volatile memory, non-volatile memory, or some combination thereof. In this regard, the memory 412 may comprise a non-transitory computer-readable storage medium. Although illustrated in FIG. 4 as a single memory, the memory 412 may comprise a plurality of memories. The plurality of memories may be embodied on a single computing device or may be distributed across a plurality of computing devices collectively configured to function as the connecting apparatus 104. In various example embodiments, the memory 412 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 412 may be configured to store information, data, applications, instructions, or the like for enabling the connecting apparatus 104 to carry out various functions in accordance with various example embodiments. For example, in some example embodiments, the memory 412 may be configured to buffer input data for processing by the processor 410. Additionally or alternatively, the memory 412 may be configured to store program instructions for execution by the processor 410. The memory 412 may store information in the form of static and/or dynamic information. This stored information may be stored and/or used by the network access module 418 during the course of performing its functionalities.

The communication interface 414 may be embodied as any device or means embodied in circuitry, hardware, a computer program product comprising computer readable program instructions stored on a computer readable medium (for example, the memory 412) and executed by a processing device (for example, the processor 410), or a combination thereof that is configured to receive and/or transmit data from/to another computing device. According to some example embodiments, the communication interface 414 may be at least partially embodied as or otherwise controlled by the processor 410. In this regard, the communication interface 414 may be in communication with the processor 410, such as via a bus. The communication interface 414 may include, for example, an antenna, a transmitter, a receiver, a transceiver and/or supporting hardware or software for enabling communications with one or more remote computing devices. The communication interface 414 may, for example, be configured to receive and/or transmit data using any protocol that may be used for communications between the connecting apparatus 104 and another computing device, such as a terminal apparatus 102. In this regard, the communication interface 414 may be configured to receive and/or transmit data using any protocol that may be used for transmission of data over a local connection 106. The communication interface 414 may additionally be in communication with the memory 412, and/or network access module 418, such as via a bus.

The network access module 418 may be embodied as various means, such as circuitry, hardware, a computer program product comprising computer readable program instructions stored on a computer readable medium (for example, the memory 412) and executed by a processing device (for example, the processor 410), or some combination thereof and, in some example embodiments, may be embodied as or otherwise controlled by the processor 410. In embodiments wherein the network access module 418 is embodied separately from the processor 410, the network access module 418 may be in communication with the processor 410. The network access module 418 may further be in communication with one or more of the memory 412, or communication interface 414, such as via a bus.

The terminal apparatus 102 may be provisioned with a plurality of network access credentials. The network access credentials may, for example, be provisioned to the terminal apparatus 102 by the provisioning apparatus 110, or other entity configured to provision network access credentials. A respective network access credential may, for example, provide configuration settings and/or other information enabling the terminal apparatus 102 to access an operator network, such as the network 112. In this regard, a network access credential may comprise security information to access an operator network, personal user information, network settings information, service-related information, access credentials, cryptographic algorithm(s), configuration information, and/or the like. A respective network access credential may correspond to an account, such that when the network access credential is used for accessing an operator's network, charges incurred for the network access may be charged to the corresponding account.

In some example embodiments, one or more of the network access credentials may comprise a network access credential for accessing a cellular network. For example, one or more of the network access credentials implemented on the terminal apparatus 102 may comprise a secure module, such as a Universal Integrated Circuit Card (UICC) module (for example, a Subscriber Identity Module (SIM) module), which may, for example, comprise an application (for example, a SIM application) or other software that may be installed on the terminal apparatus 102. In some example embodiments wherein the network access credential information comprises a secure module (for example a UICC module), the secure module may, for example, comprise a soft SIM, an embedded SIM, a soft Universal SIM (USIM), an embedded USIM, and/or the like. In this regard, in some example embodiments, a network access credential may comprise a SIM module, Universal Integrated Circuit Card (UICC) module, UICC token, and/or other secure module, that may be remotely provisioned and managed, such as by a provisioning apparatus 110. An embedded network access credential (for example, an embedded SIM, embedded USIM, or the like) may comprise a physical network access credential module (for example, a physical SIM module) that may be soldered to or otherwise firmly combined with hardware, such as within a secure or trusted environment of the hardware. An embedded network access credential may include provisioning commands, such as ISO/IEC (International Standards Organization/International Electrotechnical Commission)-7816 ADPUs/STK (Application Protocol Data Units/SIM Toolkit) operations for transporting new network access credentials (for example, secrets and identities) onto the hardware module. Such provisioning commands may be operator specific, A soft SIM, soft USIM, and/or the like may be implemented in any secure environment existing on device hardware of the terminal apparatus 102, such as within a secure module, UICC, SIM card, and/or some other Trusted Execution Environment (TEE). Accordingly, in example embodiments wherein Soft and/or embedded UICC modules (for example, soft and/or embedded SIMs) are implemented, several soft SIMs, UICC tokens, and/or the like may be implemented concurrently on the terminal apparatus 102. In some example embodiments, more than one of these network access credentials may be active simultaneously. Alternatively, the network access credentials may be selectable one at a time.

The network access credentials installed on the terminal apparatus may include a network access credential corresponding to the connecting apparatus 104. In this regard, the network access credential corresponding to the connecting apparatus 104 may correspond to an account associated with the connecting apparatus 104, such that when the network access credential corresponding to the connecting apparatus 104 is used, any charges incurred for network access may be charged to the corresponding account, and not, for example, to an account associated with the user of the terminal apparatus 102. For example, a manufacturer, vendor, servicing entity, and/or the like associated with the connecting apparatus 104 may have an account with a network operator (for example, an operator of at least a portion of the network 112). The network access credential associated with the connecting apparatus 104 may accordingly be associated with this account. The terminal apparatus 102 may, for example, be provisioned (for example, by the provisioning apparatus 110) with a network access credential corresponding to the connecting apparatus 104 in response to purchase, registration, and/or use of the connecting apparatus 104 or a service associated with the connecting apparatus 104. In this regard, provisioning of the network access credential corresponding to the connecting apparatus 104 to the terminal apparatus 102 may be coordinated at the behest of a manufacturer, vendor, servicing entity, and/or the like associated with the connecting apparatus 104.

The access control module 318 and network access module 418 may be configured to cause establishment of a local connection 106 between the terminal apparatus 102 and connecting apparatus 104. For example, the network access module 418 may be configured to recognize when the terminal apparatus 102 is within sufficient proximity of the connecting apparatus 104 such that the connecting apparatus 104 may establish a local connection 106 with the terminal apparatus 102 in response to determining that the terminal apparatus 102 is within sufficient proximity. As a further example, the access control module 318 may be configured to recognize when the terminal apparatus 102 is within sufficient proximity of the connecting apparatus 104 such that the terminal apparatus 102 may establish a local connection 106 with the connecting apparatus 104 in response to determining that the terminal apparatus 102 is within sufficient proximity of the connecting apparatus 104. As another example, a user of the terminal apparatus 102 and/or of the connecting apparatus 104 may manually cause a local connection 106 to be established between the terminal apparatus 102 and connecting apparatus 104, such as by pairing the terminal apparatus 102 and connecting apparatus 104 (for example, establishing a Bluetooth pairing between the terminal apparatus 102 and connecting apparatus 104), connecting a connection cable (for example, a USB cable, Firewire cable, or the like) between the terminal apparatus 102 and connecting apparatus 104, and/or the like. As yet another example, an entity responsible for monitoring or otherwise communicating with the connecting apparatus 104 (for example, a network node 108) may remotely trigger establishment of a local connection 106 between the terminal apparatus 102 and connecting apparatus 104.

The access control module 318 may be configured to determine a selection of a network access credential from a plurality of network access credentials installed on the terminal apparatus 102. In some example embodiments, the access control module 318 may be configured to determine a selection on the basis of a selection received from another apparatus. For example, the access control module 318 may be configured to receive a selection of a network access credential sent from the connecting apparatus 104 by the network access module 418 over the local connection 106. As another example, the access control module 318 may be configured to receive a selection of a network access credential from a network node 108 over the network 112. In this regard, an entity responsible for monitoring or otherwise communicating with the connecting apparatus 104 may be configured to remotely select a network access credential to activate a connection to the connecting apparatus 104.

In some example embodiments, the access control module 318 may be configured to determine a selection of a network access credential from a plurality of network access credentials installed on the terminal apparatus 102 on the basis of a selection made locally at the terminal apparatus 102. For example, a user of the terminal apparatus 102 may manually select a network access credential via the user interface 316.

As another example, the access control module 318 may, itself, be configured to select a network access credential. For example, the access control module 318 may be configured to select a network access credential corresponding to the connecting apparatus 104 in response to determining that a local connection 106 has been established with the connecting apparatus 104, in response to determining that the connecting apparatus 104 is within sufficient proximity of the terminal apparatus 102 to establish a local connection 106 between the connecting apparatus 104 and terminal apparatus 102, and/or the like. As another example, the access control module 318 may be configured based on a schedule or time-based rule to select a network access credential for use in providing network access to the connecting apparatus 104.

In some example embodiments, the network access credentials installed on the terminal apparatus 102 may each be associated with a respective identifier (for example, a text-based identifier, numeric identifier, alphanumeric identifier, or the like). The identifier of a respective network access credential may, for example, comprise a service parameter provisioned in conjunction with the network access credential. Accordingly, in some example embodiments, the access control module 318 may be configured to determine a selection of a network access credential based on a selection of an identifier corresponding to a network access credential. For example, in some example embodiments wherein the access control module 318 receives a selection, the received selection of the network access credential may include an indication of the identifier of the selected network access credential as a parameter to the selection request such that the access control module 318 may identify the selected network access credential.

In some example embodiments, wherein the access control module 318 is configured to receive a selection, the received selection of the network access credential may comprise an AT (Attention) command. As an example, the AT command set of TS 27.007 may be extended to include a command for selection of a network access credential. It will be appreciated, however, that an AT command set of Long Term Evolution and/or other non-GSM networks may be similarly extended. In embodiments wherein the selection is an AT command, the AT command may be sent by the connecting apparatus 104 over the local connection 106. Alternatively, the AT command may be sent by the network node 108. The AT received AT command may include a parameter identifying the selected network access credential, such as an identifier associated with the selected network access credential.

The access control module 318 may be configured to activate the selected network access credential in response to the determined selection. The activated network access credential may be used by the access control module 318 to cause the connecting apparatus 104 to be provided with access to the network 112 via the local connection 106. The network access module 418 may accordingly exchange data with the network node 108. The exchanged data may, for example, relate to operation of the connecting apparatus 104, a service performed by the connecting apparatus 104 and/or by the network node 108, data relating to a warranty on the connecting apparatus 104, and/or the like. Thus, for example, if the connecting apparatus 104 were implemented on a car, the network access module 418 might forward maintenance status data, operation information, and/or the like with the network node 108. As another example, if the connecting apparatus 104 were implemented on a refrigerator, the network access module 418 might forward collected information on the refrigerator's contents to the network node 108. As a further example, the network node 108 may send configuration information to the connecting apparatus 104 to remotely configure and/or control operation of the connecting apparatus 104. As the network access credential associated with the connecting apparatus 104 is used for providing the connection in such example embodiments, charges for the network access may be charged to the account associated with the used network access credential.

In some example embodiments, the access control module 318 may be configured to authenticate the connecting apparatus 104 prior to activating the selected network access credential, and may activate and use the selected network access credential only in an instance in which the connecting apparatus is properly authenticated. Accordingly, a connecting apparatus 104 that is not authorized to use a selected network access credential may be prevented from using the network access credential to obtain network access through the terminal apparatus 102. It will be appreciated that the authentication may be performed in any manner considered to be sufficient to authenticate the identity of the connecting apparatus 104.

As an example, the selected network access credential may have an associated activation PIN value. The network access module 418 may be configured to send the activation PIN value for the selected network access credential to the terminal apparatus 104 for purposes of authenticating the identity of the connecting apparatus 104. If a value matching the activation PIN value is received from the connecting apparatus 104, the access control module 318 may determine the connecting apparatus 104 to be properly authenticated, and may activate the selected network access credential. If, however, the received value does not match the activation PIN value, the access control module 318 may refuse to activate the selected network access credential.

As another example, the access control module 318 may issue a challenge to the connecting apparatus 104 on the basis of an identity asserted by the connecting apparatus 104. In this regard, the connecting apparatus 104 may directly assert an identity to the terminal apparatus 102, such as in an AT command or other message including an indication of the selected network access credential. Alternatively, the asserted identity may not be an identity actually asserted by the connecting apparatus 104, but rather may comprise an implied asserted identity that is known to the network access module 418 to be associated with the selected network access credential. The access control module 318 may select a challenge on the basis of the identity asserted by the connecting apparatus 104 and cause the selected challenge to be provided to the connecting apparatus 104 by way of the local connection 106. The network access module 418 may receive the challenge and issue a response to the challenge. The access control module 318 may receive the issued response and verify the response, such as by comparing the response to an expected response. If the response satisfies the challenge, the access control module 318 may determine the connecting apparatus 104 to be properly authenticated, and may activate the selected network access credential. If, however, the response does not satisfy the challenge, the access control module 318 may refuse to activate the selected network access credential.

An example of communication between the terminal apparatus 102 and connecting apparatus 104 for purposes of authenticating the connecting apparatus 104 via a challenge and response may be as follows. The network access module 418 may send an AT command to the terminal apparatus 102 including an identity of the connecting apparatus ('externaldevice_id'), a digital certificate containing its identity ('cert'), and/or the like. This AT command may, for example, be structured as follows:

>AT+UICCCHALL=<externaldevice_id/cert>

The access control module 318 may receive the AT command and select a challenge value to issue to the connecting apparatus 104 on the basis of the identity asserted in the received AT command. An example of such a challenge value that may be issued to the connecting apparatus 104 may be "81268AF91BB8236820981C62B". The network access module 418 may receive the challenge and may determine a response value to respond to the challenge. The network access module 418 may format an AT command including the determined response value and cause the formatted AT command to be sent to the terminal apparatus 102 via the local connection 106. The AT command including the response value may, for example be formatted as follows:

>AT+UICCRSP=81B65E91B63F4190DD98A361092

The access control module 318 may receive the AT command including the response value, and may extract the response value from the AT command. The access control module 318 may verify the response value, such as by comparing the received response value to an expected response value. If the received response value is verified, the access control module 318 may determine the connecting apparatus 104 to be properly authenticated, and may issue a confirmation of the authentication to the connecting apparatus 104. For example, the access control module 318 may cause an 'OK' message to be sent to the connecting apparatus 104. If, however, the connecting apparatus 104 is not properly authenticated, the access control module 318 may notify the connecting apparatus 104 of an exception to the authentication. Depending on implementation, the access control module 318 may issue a second challenge to the connecting apparatus 104 in order to re-attempt authentication of the connecting apparatus 104.

It will be appreciated that challenge-response authentication may be implemented in a variety of manners depending on the choice of challenge. As an example, a service operator 'ACME' may have a master key, which may be diversified by identity. The diversification may be provisioned to the connecting apparatus 104, and the master key (or partial/full diversification) may be provisioned to the network access credential installed on the terminal apparatus 102 that is associated with the connecting apparatus 104. In such example embodiments, the network access module 418 may assert an identity of the connecting apparatus 104 to the terminal apparatus 102. The access control module 318 may determine which key (for example, which diversification of the master key) to use on the basis of the asserted identity. The access control module 318 may issue a challenge to the connecting apparatus 104 on the basis of the determined key. For example, the determined key may be used as an input into a function for determining the challenge issued to the connecting apparatus 104. The challenge may accordingly comprise a random number or nonce that may be calculated on the basis of the determined key. The network access module 418 may compute a response to the challenge, such as on the basis of a key of the access control module 318 (for example, the same diversification of the master key as may be determined by the access control module 318) and the challenge value. In this regard, a symmetric, or shared key, may be used to facilitate authentication through symmetric digital signature calculation. For example, the network access module 418 may compute a Hash-based Message Authentication Code (HMAC) on the basis of the key and the challenge value, which may be denoted as HMAC(k, chall). The HMAC The network access module 418 may send the response to the terminal apparatus 102 for verification.

As another example, in some example embodiments, public key cryptography may be used to support challenge-response authentication. In this regard, the network access module 418 may provide the terminal apparatus 102 with a copy of a digital certificate of the connecting apparatus 104. The access control module 318 may validate the certificate and extract the public key from the certificate. The access control module 318 may send a challenge value to the connecting apparatus 104. The network access module 418 may receive the challenge and compute a digital signature over the challenge using a private key of the connecting apparatus 104. The network access module 418 may send the digital signature to the terminal apparatus 102 for validation. In this regard, the access control module 318 may be configured to use the public key of the connecting apparatus 104 to verify the digital signature.

In some example embodiments the access control module 318 may be configured to cause a notification of requested network usage to be provided to a user of the terminal apparatus 102 by way of the user interface 316. This notification may be provided prior to activation of a selected network access credential and may include a prompt for confirmation/authorization of the usage of the network by the connecting apparatus 104. In such example embodiments, the access control module 318 may activate and use a selected network access credential to provide network access to the connecting apparatus 104 only if the user affirms the action. The user notification may be performed in addition to, or in lieu of, authentication of the connecting apparatus 104. An example of a notification that may be provided to a user is illustrated in FIG. 5. The notification may include an indication of the service provider (for example, "ACME") which may use the terminal apparatus 102 for network communication if the connecting apparatus 104 is provided with network access via a selected network access credential. The service provider may comprise a service provider associated with the selected network access credential. The user may additionally be informed that he or she will not be charged for the communication. The user may select to allow activation of the network access credential by selecting "OK" 502. The user may deny the network communication request by selecting "Cancel" 504.

The access control module 318 may be further configured to cause an indication of network access being provided to the connecting apparatus 104 while the connecting apparatus 104 is being provided with network apparatus. The notification may, for example, comprise an indication of a service provider associated with the connecting apparatus 104 and/or with the network access credential being used to provide the connecting apparatus 104 with network access. For example, the indication 602 in FIG. 6 indicates that network access is being used by the service provider "ACME."

FIG. 7 illustrates a flowchart according to an example method for providing network access to a connecting apparatus according to some example embodiments. In this regard, FIG. 7 illustrates operations that may be performed at the terminal apparatus 102. The operations illustrated in and described with respect to FIG. 7 may, for example, be performed by, with the assistance of, and/or under the control of one or more of the processor 310, memory 312, communication interface 314, user interface 316, or access control module 318. Operation 700 may comprise determining, at a terminal apparatus, a selection of a network access credential for a network from a plurality of available network access credentials installed on the terminal. The processor 310, memory 312, communication interface 314, and/or access control module 318 may, for example, provide means for performing operation 700. Operation 710 may comprise activating the selected network access credential in response to the selection. The processor 310, memory 312, communication interface 314, and/or access control module 318 may, for example, provide means for performing operation 710. Operation 720 may comprise using the activated network access credential to cause a connecting apparatus to be provided with access to the network via a local connection between the terminal apparatus and the connecting apparatus. The processor 310, memory 312, communication interface 314, and/or access control module 318 may, for example, provide means for performing operation 720.

FIG. 8 illustrates a flowchart according to another example method for providing network access to a connecting apparatus according to some example embodiments. In this regard, FIG. 8 illustrates operations that may be performed at the terminal apparatus 102. The operations illustrated in and described with respect to FIG. 8 may, for example, be performed by, with the assistance of, and/or under the control of one or more of the processor 310, memory 312, communication interface 314, user interface 316, or access control module 318. Operation 800 may comprise determining, at a terminal apparatus, a selection of a network access credential for a network from a plurality of available network access credentials installed on the terminal. The processor 310, memory 312, communication interface 314, and/or access control module 318 may, for example, provide means for performing operation 800. Operation 810 may comprise authenticating a connected apparatus. The processor 310, memory 312, communication interface 314, and/or access control module 318 may, for example, provide means for performing operation 810. Operation 820 may comprise determining whether the connecting apparatus was properly authenticated. The processor 310, memory 312, and/or access control module 318 may, for example, provide means for performing operation 820.

In an instance in which it is determined in operation 820 that the connecting apparatus was properly authenticated, operation 830 may comprise activating the selected network access credential. The processor 310, memory 312, communication interface 314, and/or access control module 318 may, for example, provide means for performing operation 830. Operation 840 may comprise using the activated network access credential to cause a connecting apparatus to be provided with access to the network via a local connection between the terminal apparatus and the connecting apparatus. The processor 310, memory 312, communication interface 314, and/or access control module 318 may, for example, provide means for performing operation 840.

If, however, it is determined in operation 820 that the connecting apparatus was not properly authenticated, operation 850 may comprise denying activation of the selected network access credential and refusing to provide network access to the connecting apparatus. The processor 310, memory 312, communication interface 314, and/or access control module 318 may, for example, provide means for performing operation 850.

FIGS. 7-8 each illustrate a flowchart of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 312 and/or in the memory 412) and executed by a processor in the computing device (for example, by the processor 310 and/or by the processor 410). In some example embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a connecting apparatus 104, terminal apparatus 102, and/or other apparatus) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, a connecting apparatus 104, terminal apparatus 102, and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. According to some example embodiments, a suitably configured processor (for example, the processor 310 and/or processor 410) may provide all or a portion of the elements. In other example embodiments, all or a portion of the elements may be configured by and operate under control of a computer program product. The computer program product for performing the methods of some example embodiments may include a computer-readable storage medium (for example, the memory 312 and/or the memory 412), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   determining, at a terminal apparatus, a selection of a network access credential for a network from a plurality of available network access credentials installed on the terminal apparatus;
   authenticating a connecting apparatus that is connecting to the terminal apparatus via a wireless connection;
   determining by the terminal apparatus that the authentication is successful;
   responsive to the selection and the determination, activating the selected network access credential only in an instance in which the connecting apparatus is properly authenticated; and
   using the activated network access credential to cause the connecting apparatus to be provided with access to the network via a local connection between the terminal apparatus and the connecting apparatus.

2. The method of claim 1, wherein the selected network access credential corresponds to an account associated with the connecting apparatus such that any charges for the network access provided to the connecting apparatus are charged to the account associated with the connecting apparatus.

3. The method of claim 1, wherein the network comprises a cellular network, and wherein the plurality of available network access credentials comprise access credentials for the cellular network.

4. The method of claim 1, wherein each of the plurality of available network access credentials is associated with a respective identifier, and wherein determining a selection of a network access credential comprises determining the selection based at least in part on a received indication of an identifier associated with the selected network access credential.

5. The method of claim 1, wherein determining a selection of a network access credential comprises determining a selection of a network access credential based at least in part on an indication of the selected network access credential received as a parameter in a remote AT command received from the connecting apparatus.

6. The method of claim 1, wherein determining a selection of a network access credential comprises determining a selection of a network access credential based at least in part on an indication of the selected network access credential received over the network from a network node.

7. The method of claim 1, wherein authenticating the connecting apparatus comprises:
   determining an identity asserted by the connecting apparatus;

selecting a challenge based at least in part on the determined identity;
causing the selected challenge to be provided to the connecting apparatus;
verifying a response to the challenge received from the connecting apparatus; and
authenticating the connecting apparatus based at least in part on a result of the verification.

8. The method of claim 1, further comprising, prior to activating the selected network access credential:
causing a notification and prompt for confirmation of usage of the network by the connecting apparatus to be provided by a user interface; and
activating and using the selected network access credential only in an instance in which user confirmation is received in response to the notification and prompt.

9. An apparatus comprising at least one processor and at least one memory storing computer program code, wherein the at least one memory and stored computer program code are configured, with the at least one processor, to cause the apparatus to at least perform:
determining, at a terminal apparatus, a selection of a network access credential for a network from a plurality of available network access credentials installed on the terminal apparatus;
authenticating a connecting apparatus that is connecting to the terminal apparatus via a wireless connection;
determining by the terminal apparatus that the authentication is successful;
responsive to the selection and the determination, activating the selected network access credential only in an instance in which the connecting apparatus is properly authenticated; and
using the activated network access credential to cause the connecting apparatus to be provided with access to the network via a local connection between the terminal apparatus and the connecting apparatus.

10. The apparatus of claim 9, wherein the selected network access credential corresponds to an account associated with the connecting apparatus such that any charges for the network access provided to the connecting apparatus are charged to the account associated with the connecting apparatus.

11. The apparatus of claim 9, wherein the network comprises a cellular network, and wherein the plurality of available network access credentials comprise access credentials for the cellular network.

12. The apparatus of claim 9, wherein each of the plurality of available network access credentials is associated with a respective identifier, and wherein determining a selection of a network access credential comprises determining the selection based at least in part on a received indication of an identifier associated with the selected network access credential.

13. The apparatus of claim 9, wherein determining a selection of a network access credential comprises determining a selection of a network access credential based at least in part on an indication of the selected network access credential received as a parameter in a remote AT command received from the connecting apparatus.

14. The apparatus of claim 9, wherein determining a selection of a network access credential comprises determining a selection of a network access credential based at least in part on an indication of the selected network access credential received over the network from a network node.

15. The apparatus of claim 9, wherein authenticating the connecting apparatus comprises:

determining an identity asserted by the connecting apparatus;
selecting a challenge based at least in part on the determined identity;
causing the selected challenge to be provided to the connecting apparatus;
verifying a response to the challenge received from the connecting apparatus; and
authenticating the connecting apparatus based at least in part on a result of the verification.

16. The apparatus of claim 9, wherein the at least one memory and stored computer program code are configured, with the at least one processor, to cause the apparatus to further perform, prior to activating the selected network access credential:
causing a notification and prompt for confirmation of usage of the network by the connecting apparatus to be provided by a user interface; and
activating and using the selected network access credential only in an instance in which user confirmation is received in response to the notification and prompt.

17. The apparatus of claim 9, wherein the apparatus comprises or is embodied on the terminal apparatus, the terminal apparatus comprising a mobile computing comprising user interface circuitry and user interface software stored on one or more of the at least one memory; wherein the user interface circuitry and user interface software are configured to:
facilitate user control of at least some functions of the mobile computing device through use of a display; and
cause at least a portion of a user interface of the mobile computing device to be displayed on the display to facilitate user control of at least some functions of the mobile computing device.

18. A non-transitory computer program product comprising at least one computer-readable medium having computer-readable program instructions stored therein, the computer-readable program instructions comprising instructions, which when performed by an apparatus, are configured to cause the apparatus to at least perform:
determining, at a terminal apparatus, a selection of a network access credential for a network from a plurality of available network access credentials installed on the terminal apparatus;
authenticating a connecting apparatus that is connecting to the terminal apparatus via a wireless connection;
determining by the terminal apparatus that the authentication is successful;
responsive to the selection and the determination, activating the selected network access credential only in an instance in which the connecting apparatus is properly authenticated; and
using the activated network access credential to cause the connecting apparatus to be provided with access to the network via a local connection between the terminal apparatus and the connecting apparatus.

19. The computer program product of claim 18, wherein the selected network access credential corresponds to an account associated with the connecting apparatus such that any charges for the network access provided to the connecting apparatus are charged to the account associated with the connecting apparatus.

20. The computer program product of claim 18, wherein the network comprises a cellular network, and wherein the plurality of available network access credentials comprise access credentials for the cellular network.

21. The computer program product of claim 18, wherein each of the plurality of available network access credentials is associated with a respective identifier, and wherein determining a selection of a network access credential comprises determining the selection based at least in part on a received indication of an identifier associated with the selected network access credential.

22. The computer program product of claim 18, wherein determining a selection of a network access credential comprises determining a selection of a network access credential based at least in part on an indication of the selected network access credential received as a parameter in a remote AT command received from the connecting apparatus.

23. The computer program product of claim 18, wherein determining a selection of a network access credential comprises determining a selection of a network access credential based at least in part on an indication of the selected network access credential received over the network from a network node.

24. The computer program product of claim 18, wherein authenticating the connecting apparatus comprises:
   determining an identity asserted by the connecting apparatus;
   selecting a challenge based at least in part on the determined identity;
   causing the selected challenge to be provided to the connecting apparatus;
   verifying a response to the challenge received from the connecting apparatus; and
   authenticating the connecting apparatus based at least in part on a result of the verification.

25. The computer program product of claim 18, the computer-readable program instructions comprising instructions, which when performed by the apparatus, are configured to cause the apparatus to further perform, prior to activating the selected network access credential:
   causing a notification and prompt for confirmation of usage of the network by the connecting apparatus to be provided by a user interface; and
   activating and using the selected network access credential only in an instance in which user confirmation is received in response to the notification and prompt.

26. An apparatus comprising:
   means for determining, at a terminal apparatus, a selection of a network access credential for a network from a plurality of available network access credentials installed on the terminal apparatus;
   means for authenticating a connecting apparatus that is connecting to the terminal apparatus via a wireless connection;
   means for determining by the terminal apparatus that the authentication is successful;
   means for responsive to the selection and the determination, activating the selected network access credential only in an instance in which the connecting apparatus is properly authenticated; and
   means for using the activated network access credential to cause the connecting apparatus to be provided with access to the network via a local connection between the terminal apparatus and the connecting apparatus.

* * * * *

UNITED STATES PATENT AND TRADEMARK OFFICE
CERTIFICATE OF CORRECTION

PATENT NO. : 9,549,366 B2  
APPLICATION NO. : 14/128662  
DATED : January 17, 2017  
INVENTOR(S) : Ekberg et al.

Page 1 of 1

It is certified that error appears in the above-identified patent and that said Letters Patent is hereby corrected as shown below:

On the Title Page

Item (73) Assignee: "Nokie Technologies Oy" should read --Nokia Technologies Oy--.

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*